United States Patent
Bruhn

(10) Patent No.: US 7,289,451 B2
(45) Date of Patent: Oct. 30, 2007

(54) DELAY TRADING BETWEEN COMMUNICATION LINKS

(75) Inventor: Stefan Bruhn, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1036 days.

(21) Appl. No.: 10/280,096

(22) Filed: Oct. 25, 2002

(65) Prior Publication Data

US 2004/0081106 A1 Apr. 29, 2004

(51) Int. Cl.
*H04L 12/26* (2006.01)
(52) U.S. Cl. ........................ 370/252; 370/519
(58) Field of Classification Search ............... 370/252, 370/519
See application file for complete search history.

(56) References Cited

U.S. PATENT DOCUMENTS

| | | | | |
|---|---|---|---|---|
| 6,182,032 | B1 | 1/2001 | Rapeli | 704/214 |
| 6,829,244 | B1 * | 12/2004 | Wildfeuer et al. | 370/412 |
| 6,894,715 | B2 * | 5/2005 | Henrikson | 348/14.07 |
| 2003/0043934 | A1 * | 3/2003 | Roberts | 375/316 |
| 2004/0032860 | A1 * | 2/2004 | Mundra et al. | 370/352 |

FOREIGN PATENT DOCUMENTS

WO 99/13608 3/1999

OTHER PUBLICATIONS

Baldi, M. et al., End-To-End Delay Analysis of Videoconferencing Over Packet-Switched Networks, INFOCOM '98, 17th Annual Joint Conference of IEEE Computer and Communications Societies Proceedings, Mar. 29-Apr. 2, 1998, pp. 479-492, IEEE/ACM Transactions on Networking, vol. 8, No. 4, Aug. 2000.
International Search Report of PCT/SE 03/01411 dated Dec. 9, 2003.
Schulzrinne et al., *RTP: A Transport Protocol for Real-Time Applications*, Network Working Group, Request for Comments: 1889; Category Standards Track, Jan. 1996, pp. 1, 23-27.
Liang et al., *Adaptive Playout Scheduling and Loss Concealment for Voice Communication over IP Networks*, pp. 1-12.

* cited by examiner

*Primary Examiner*—Brian Nguyen
(74) *Attorney, Agent, or Firm*—Nixon & Vanderhye P.C.

(57) ABSTRACT

The available delay budget for a full-duplex communication is distributed between the links depending on their activity, present and near history. By keeping track on if a link in a full-duplex communication system is active or inactive, i.e. Knowing the information value of the transferred data, coding procedures having larger coding delays than normally accepted can be used for active links, if the opposite link simultaneously is inactive. Since the user sensibility for delays is as largest at the moment a link becomes active, coding procedures having smaller coding delays than normally used are assigned at the moment a link becomes active. The coding delay is subsequently increased. Preferably, the round-trip delay is controlled to be kept smaller than a requested maximum value.

46 Claims, 11 Drawing Sheets

DELAY TRADING BETWEEN COMMUNICATION LINKS

TECHNICAL FIELD

The present invention relates in general to full-duplex communication between terminals of a communication network and in particular to disposition of delay times within such communication systems.

BACKGROUND

Delay is a crucial parameter in each kind of communication service, from simple telephony to advanced multimedia communication. Conversational services are characterized by inter activity between the users at the ends of the communication links. Delay, or more precisely, round-trip delay has an important impact on the feeling of inter activity and thus the quality of the service. The parties interacting via the communication network should have a possibility to interact in the same manner as if they were present at the same place. The communication means should thereby be as invisible as possible. A high round-trip delay leads to long response times. Such long response times in general disturb the flow of the conversation and may be interpreted by the inter actors as a hesitation from the other party or may lead to annoying inactive waiting periods. Modern human beings are used to receive quite rapid answers and even relatively short delays may cause frustration. A high round-trip delay thus degrades the inter activity significantly. Moreover, insufficient cancellation of electrical or acoustical echoes may impact the communication quality if the round-trip delay is too high.

On the other hand, on each link of the communication delay is required from a transmission point of view. In addition to the basic delay for the transmission itself, coding delay is needed both for increased source coding efficiency and for more efficient strategies to combat transmission deficiencies. Generally speaking, coding delay which can be used for source coding, channel coding, interleaving, coded modulation, etc., gives a coding gain by which the transmission power can be reduced without degrading the transmission performance. In the context of the present disclosure, even delays for jitter buffering in case of packet transmission is considered as coding delay. Delays are therefore important and even necessary for providing problem-free transmission. All delays on one link sums up to the end-to-end delay, sometimes also referred to as mouth-to-ear delay. The round-trip delay is further the sum of the end-to-end delays of a original transmission and the reply thereon, respectively.

From the transmission point of view, delays are beneficial, but for providing an acceptable service quality for conversational services, delays have to be kept within certain limits. The coding gains achieved with the coding delay therefore have to be traded against the loss in inter activity due to resulting round-trip delay.

In some way all communication services trade delay against coding gain. AN example from speech communications with circuit-switched transmission is given with the ARM telephony service in today's GM system. The source coding involves a delay of 25 ms, the channel coding including interleaving on the FR speech traffic channel a delay of 37.5 ms. On top of that come certain delays, e.g. for digital and analogue signal processing, radio burst generation, modulation and demodulation, radio transmission, serial transmission on the Abis interface between base station and transcoder, etc. These delays are fixed during the speech connection.

An example from speech communications with packet-switched transmission is given with telephony services in the Internet. Here, the end-to-end delay from analogue signal input at the sending side to analogue output at the receiving side is, disregarding other contributors, caused by the transmission time of the data packets from sender to receiver, by jitter buffers which aim to cope with transmission delay variations, and sample synchronization techniques which align the asynchronous sample clocks at sender and receiver to each other. The jitter buffer delay at the receiver can be regarded as equivalent to the delay due channel coding in the example of circuit-switched transmission. In contrast to that case, the end-to-end delay can be varying. These variations are caused by adaptive jitter buffer techniques, which try to minimize the number of packet losses while keeping the end-to-end delay low. Changes of the transmission conditions e.g. due to congestion may lead to adjustments of the jitter buffer size, which in turn results in a variation of the end-to-end delay. There exist more or less advanced techniques for sample synchronization, which are also applicable when modifying the jitter buffer size. This ranges from simple insertion or deletion of signal samples to time-scale modification, which allows playing out the signal at different speeds without causing noticeable artifacts.

Half-duplex communication channels can carry data in either direction but not both directions at once. This implies that if a half-duplex channel shall be used for a speech communication, then only a signal originating from the active partner is transmitted to the passive partner but no signal is transmitted from the passive to the active partner. Such way, the transmission resource is shifted between the communication partners depending on their present activity. Communications via half-duplex channels make use of an asymmetry property according to which only one conversation link is active at a time. The inter activity on half-duplex channels is thereby severely limited, since a strict one-at-a time principle has to be fulfilled.

In U.S. Pat. No. 6,182,032 B1, a communication method applicable to half-duplex or one-way communication is presented. In one-way communication, the actual delay is of minor importance since no feed-back is present, and therefore a signal delay is allowed to increase, if the link is found to be a one-way communication link. It is thereby possible to modify e.g. encoding delays and to decrease the bit rate. This will reduce the demand for radio resources and result in a more efficient use of the available system resources. The method may be useful where one-way communication is to be expected, e.g. in cases of voice mail, message services, i.e. when a terminal acts as a source or sink for voice data, but not both. It is, however, concluded in the very disclosure that this solution is not applicable to full-duplex situations.

SUMMARY

A general problem with prior art full-duplex communication systems is that the a trade off between inter activity experience and service quality is necessary within a limited amount of available resources within the communication system.

A general object is thus to provide methods and systems improving the possibilities for delay trade off. A further object is to provide methods and systems using asymmetry properties of conversational communication for delay trade purposes.

In general words, the available delay budget for a frill-duplex communication is distributed between the links depending on their activity, present and near history. By keeping track on if a link in a frill-duplex communication system is active or inactive, i.e. Knowing the information value of the transferred data, coding procedures having larger coding delays than normally accepted can be used for active links, if the opposite link simultaneously is inactive. Since the user sensibility for delays is as largest at the moment a link becomes active, coding procedures having smaller coding delays than normally used are assigned at the moment a link becomes active. The coding delay is subsequently increased. Preferably, the round-trip delay is controlled to be kept smaller than a requested maximum value.

The advantage of the technology described in this application is that it can lead to service quality improvements and system capacity gains in systems deploying conversational services. These improvements are provided without deteriorating the experienced round-trip delay or the true full-duplex possibilities.

BRIEF DESCRIPTION OF THE DRAWINGS

The invention, together with further objects and advantages thereof, may best be understood by making reference to the following description taken together with the accompanying drawings, in which.

DETAILED DESCRIPTION

In prior art systems, when discussing round-trip delays, it is typically assumed that the system is symmetric, i.e. the same amount of information is transferred in either direction. It has therefore been a common assumption that both communication directions should be viewed as equivalent, and the coding delay budget is therefore distributed in equal parts to both communication directions.

However, even if the long-time average properties of the data transferred in the different directions typically are symmetric, the instantaneous properties of the links in a full-duplex conversational communication are not. In fact, there is a strong asymmetry. An important characteristic of many conversational services is thus the fact that the needed transmission resources at a given time are asymmetric. This is due to that in a conversation usually one party is active while the other is listening, or in case of a multi-party communication the others are listening. Considering this fact, round-trip delay is of time-varying relevancy. The crucial time instant is when the communication direction changes direction, since it is then identical to the response time. It does not matter for the users of the system if data corresponding to inactivity, i.e. data having a negligible information value, is delayed or arrives in a worse quality.

The state-of-the-art solutions both with circuit-switched and packet-switched transmission ignore the fact that the signals to be transmitted in conversational services have time-varying coding gain and delay requirements depending on the present signal type. As an example, active speech has a much higher information content than an inactivity signal and thus needs more efficient source and channel coding imposing higher coding delay.

However, today's mobile speech communication systems exploit the fact that conversational speech is a temporarily varying process with e.g. active speech and silence segments by Source-Controlled-Rate (SCR) operation. This kind of operation adapts e.g. the instantaneous bit rate to the present bit rate requirements of input signal and is used in systems with Discontinuous Transmission (DTX) mode, which basically stops the transmission during speech pauses. SCR operation sometimes implies higher coding delay of the inactivity noise signal. SCR operation makes use of a Voice Activity Detector (VAD), which detects if the present signal is active speech or silence. Thus, SCR operation makes use of the fact that a speech signal requires a time-varying bit rate depending on its contents. However, with or without SCR operation, no attempts have so far been made to control the coding gain by adapting the delay to the signal, since there will appear timing difficulties. The coding is thus less efficient than it could be.

Figure 1:
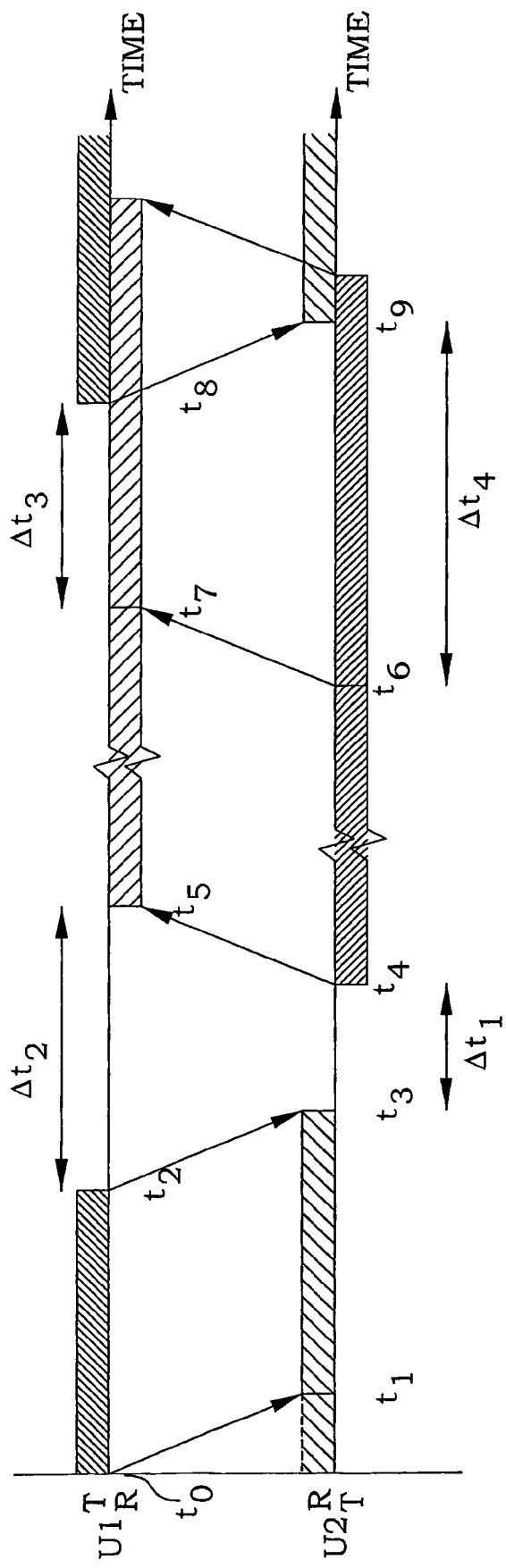
FIG. 1 is a time diagram illustrating a conversation using a prior art system.

A prior-art procedure for a typical conversational situation is first described in FIG. 1. Here a requested maximum round-trip delay is assumed to be 500 ms. This value is approximately what can be accepted in most systems assuming good echo cancellation, but the values of delays in the following examples are only just examples to have something to count with. Any size of delays can be used. In this first example according to prior art, the available delay is divided in two equal parts, 250 ms for each direction.

Two users U1 and U2 are conversing. At time $t_0$, user U1 is active and talks. The speech, illustrated as a hatched area at the T (transmitting) level of the user U1 part, is transferred to user U2, who receives the speech, illustrated as another hatched area at the R (receiving) level of the user U2 part, with a 250 ms delay. The information given by user U1 at $t_0$ is thus received by U2 at time $t_1$. User U1 continues to speak until time $t_2$. The end of the speech trigs a response from user U2. This end of speech is presented to U2 at $t_3$, with the ordinary 250 ms delay. User U2 uses a reaction time $\Delta t_1$ to initiate his answer, and at time $t_4$, user U2 becomes active and starts to speak. The start of the U2 speech arrives at U1 at time $t_5$. User U1 experiences a total response time $\Delta t_2$, which is the sum of the actual reaction time $\Delta t_1$ and the delay in both communication directions, i.e. the experienced delay time becomes:

$$\Delta t_2 = \Delta t_1 + 250 \text{ ms} + 250 \text{ ms}.$$

If the response time $\Delta t_2$ becomes too large, the conversation becomes difficult to perform. However, this response time is more or less only experienced in connection with the absolute onset of speech in one of the directions. During a continuous flow of speech, the sensitivity for delays is generally much smaller.

U2 continues to speak. At time $t_6$, U2 gives some information that trigs U1 to an interruptive answer. This information reaches U1 at time $t_7$. A reaction time $\Delta t_3$ is used by the user U1 before the onset of speech, at $t_8$. This onset is reaching U2 at time $t_9$, giving a total response time of $\Delta t_4$. In analogy with above:

$\Delta t_4 = \Delta t_3 + 250$ ms $+250$ ms.

In FIG. 1, it is easily recognized that most of the time, at least one of the users is inactive. During such periods, the delay of the data representing the silence is totally irrelevant for the experience of the ease of conversation. In many cases, as mentioned above, the true silence signal is not even transferred but instead comfort noise or SID (Silence Descriptor) parameters. This asymmetry is used to achieve benefits for the system.

In this illustrative example, as well as in the following two examples, it is assumed that a actual transmission delay is known. Typically, the transmission delay has a certain statistical distribution. These details will be discussed further below, and in the first illustrative examples, the transmission delay is for simplicity considered as known and constant.

Figure 2:
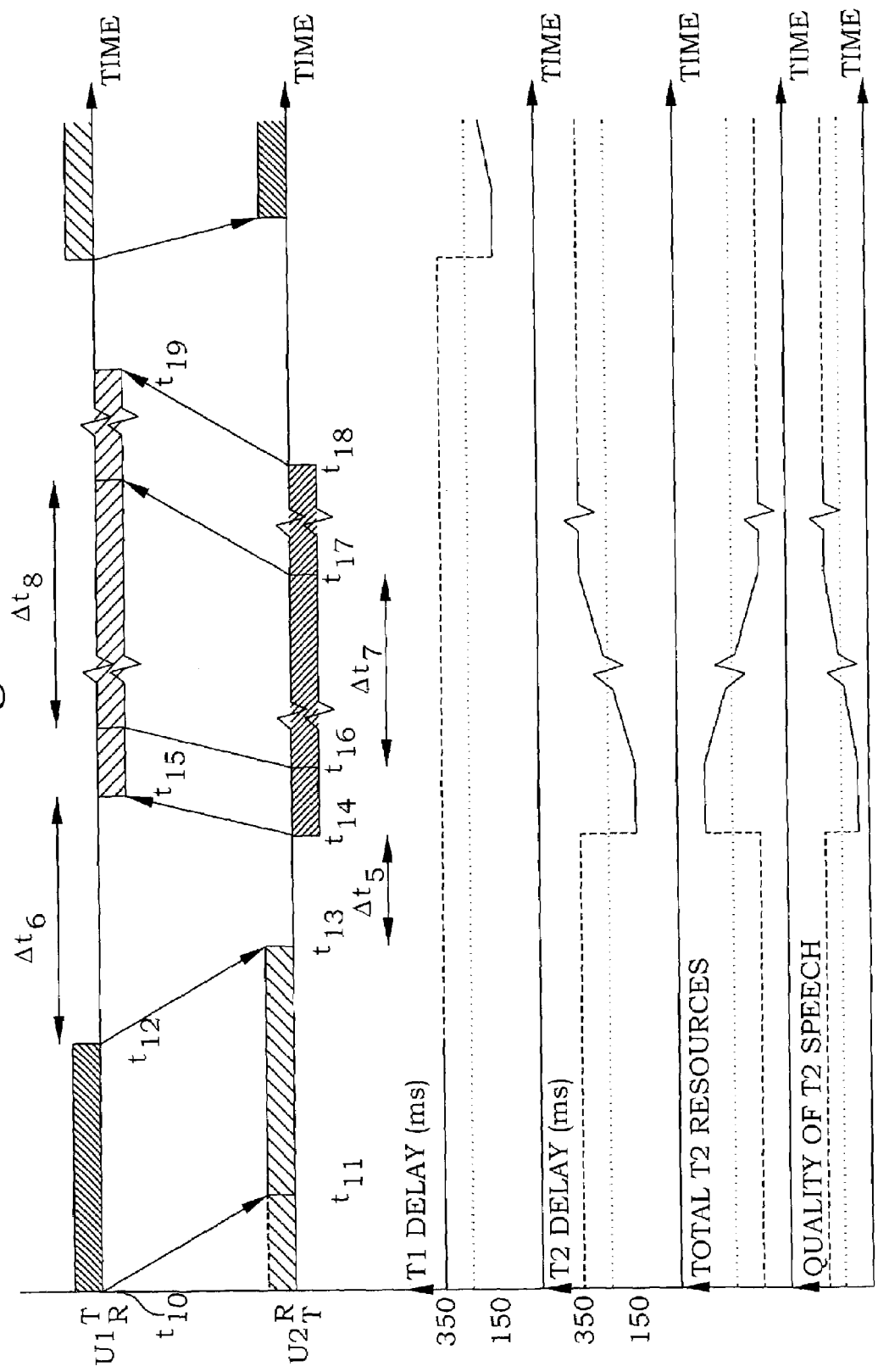
FIG. 2 is a time diagram illustrating a conversation.

In FIG. 2, a situation is illustrated. In this first simple example, it is assumed that only one user at a time speaks, in order to facilitate the understanding of the basic ideas of the invention. At the top of the figure, illustrations of the active periods for the two conversing users are shown together with delay times and times of arrival of speech, in analogy with FIG. 1. In the middle of FIG. 2, the delay times for transmission in the different directions are indicated. T1 is the transmission from user U1 to user U2 and T2 is the transmission from user U2 to user U1.

At time $t_{10}$, user U1 speaks and user U2 is silent. This speech is according to the delay scheme in the middle of FIG. 2 delayed 350 ms during its coding/decoding, transfer etc. to user U2. User U2 thus experiences the speech at time $t_{11}$. The delay time for data in the opposite direction is of no importance, since no data of informational value is transferred in this direction. User U1 stops speaking at time $t_{12}$, which is recognized by user U2 at time $t_{13}$, 350 ms delayed. User U2 reacts on this stop during a reaction time of $\Delta t_5$ and starts to deliver an answer at time $t_{14}$. When user U2 becomes active, the delay in this transfer direction becomes of importance. A transfer mode having a reduced delay is thus employed at the onset of speech, see the T2 delay diagram in the middle of FIG. 2. In this case a transfer mode having a delay of 150 ms is employed. The speech onset, created at $t_{14}$, is thus presented to user U1 at time $t_{15}$. User U1 experiences a reply time of $\Delta t_6$:

$\Delta t_6 = \Delta t_5 + 350$ ms $+ 150$ ms.

The onset of the reply is thus presented to user U1 with exactly the same round-trip delay as it would with conventional techniques.

However, the transfer having 150 ms delay is very resource demanding or results in a low speech quality. Therefore, a change to transfer modes having higher delays is requested. User U1 is inactive, and after a short period of time, at time $t_{16}$, the transfer mode is in this embodiment changed to a mode having a delay of 350 ms. The change is carried through at time $t_{17}$, i.e. the delay gradually approaches the final value. At the U2 side the speech of the interval $\Delta t_7$ is transmitted to the U1 side to be received within the time interval of $\Delta t_8$. Since the duration of $\Delta t_8$ is larger than $\Delta t_7$, the speech has to be delayed gradually. This delay can be taken care of at the sender or, preferably, at the receiver end e.g. by stretching techniques, or by inserting short silence intervals e.g. between two words. This will be discussed more in detail further below. In such cases, user U1 will hardly notice the extra delay in the middle of the speech.

The speech from U2 to U1 is now transferred with the increased delay of 350 ms. User U2 becomes inactive at time $t_{18}$, and this inactivity is presented to U1 at time $t_{19}$. User U1 can then prepare his answer.

One immediately notices, that the major part of the communication according to the present invention is performed using a transfer mode having an increased delay (350 ms in the present example). At the same time, the speech onset round-trip delay is preserved (at 500 ms in the present example).

The available extra delay time can be utilized in different manners. Two examples are given in the bottom of FIG. 2. In a first example, the increased delay is used to reduce the transmission resource demands. The dotted line corresponds to the resource demands using conventional delay distribution. The full line represents the resource demands when using the present embodiment of the present invention. One notices that an overall reduction in resource demand becomes the result. At time $t_{14}$, i.e. at the onset of the answer of user U2, the used transfer mode has a delay of only 150 ms, which means that the transmission resources are used in a higher degree than normal. However, the time period in which this higher resource utilization is needed is very short, and the mean resource utilization is thus significantly reduced. Since such resource utilization peaks occur at the onset of speech, such occasions will be statistically spread over the time and for a large system handling a multitude of conversations, this will result in a small increase in resource utilization. However, compared with the large reduction during the remaining time, this increase is very small indeed.

Another way to utilize the increased available delay time is instead to increase the quality of speech. Since a better coding can be achieved, the quality can be improved. This is illustrated in the very bottom of FIG. 2. Here a quality measure is drawn as a function of time for the overall conversational communication. One realizes that the mean quality of the conversation is increased. However, in analogy with the resource utilization case, the situation is different just at the onset of the speech, when a low delay is used. This means that the quality of speech drops just at the onset of speech, but recovers rapidly when the used delay is increased.

As anyone skilled in the art realizes, the increase available delay can also be utilized many other ways. For instance, a combination of quality increase and resource demands can be employed.

The price one has to pay for achieving these advantages is a total of 200 ms delay of the entire conversation each time the speech direction changes. Since this delay preferably is hidden within the continuous speech, the users will probably not notice the delay at all. However, the response time, i.e. the round-trip time at onset of speech, which is the crucial time for having an unaffected conversation, remains unchanged.

In the above example, the conversing users were very well behaving, waiting for the other part to end his speech before answering. However, conversation typically comprises also interruptions, simultaneous two-way speech etc. The scheme described above does indeed provide an improvement also in such situations. The most crucial occasion, when an user is most susceptible for delay related annoyance, is at the onset of speech of one of the users. The solution presented above solves that problem even when the onset occurs during the continuous speech of the other user. However, since the delay time is increased after the onset, the true round-trip delay will increase if both parties continue to talk. Probably, this is of less importance, since the conversators are occupied by their own talking and are therefore probably less sensitive for minor extra delays.

There might, however, be situations in which such an increase in response time cannot be tolerated. Such a case is e.g. in strong background noise environments, where inactivity comprising the background noise erroneously is classified as active speech. Preferred embodiments of the present invention does, however, also comply with these situations.

Figure 3:
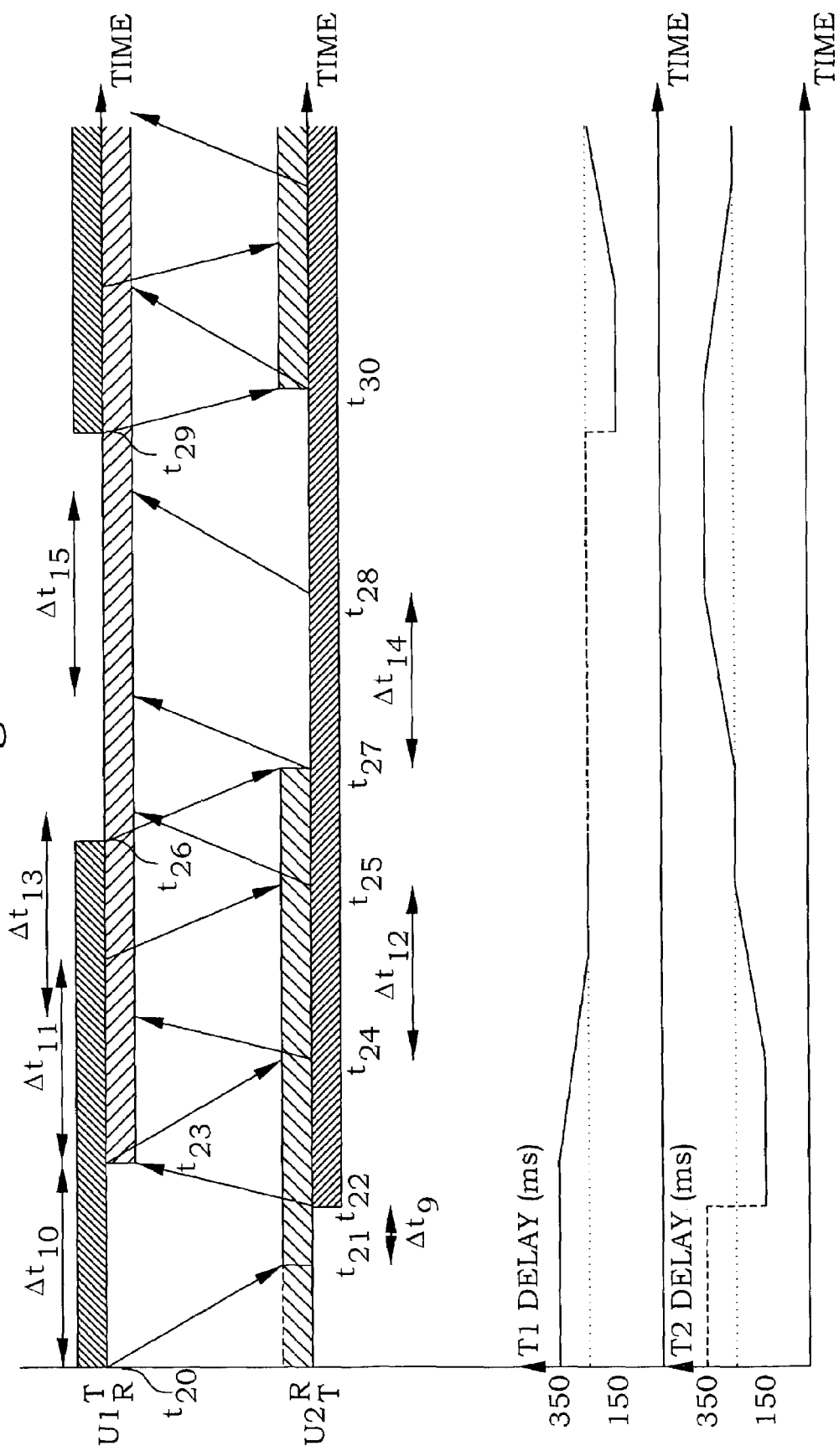
FIG. 3 is a time diagram illustrating a conversation comprising simultaneous speech.

In FIG. 3, another example is given. Also here, a total round-trip delay of maximum 500 ms is assumed, and transfer modes having delay times from 150 ms to 350 ms are possible to employ.

At time $t_{20}$, user U1 speaks. The speech is transferred with a 350 ms delay and reaches user U2 at time $t_{21}$. The information reaching user U2 trigs the user to interrupt, i.e. starting a reply before user U1 as ended his speech. After a reaction time $\Delta t_9$, user U2 starts his reply at $t_{22}$, employing a delay time of 150 ms. The onset of the reply reaches user U1 at $t_{23}$, which gives a total reply delay of $\Delta t_{10}$. This delay is in analogy with above:

$$\Delta t_{10} = \Delta t_9 + 350 \text{ ms} + 150 \text{ ms}.$$

When the reply reaches user U1, both communication directions are active simultaneously. Accordingly, the transfer mode for the speech of user U1 has to be changed to a transfer mode having a shorter delay, preferably half the total allowed round-trip delay of, i.e. 250 ms. The speech of user U1, transferred immediately before the arrival of the onset of speech from user U2, i.e. just before $t_{23}$ will be transferred with a high delay. During a time interval $\Delta t_{11}$, the transfer mode is gradually changed to approach and eventually employ a delay of 250 ms. The end of this speech section will therefore arrive at user U2 at $t_{25}$. The speech of the interval $\Delta t_{11}$ will therefore be presented to user U1 during a slightly shorter time interval $\Delta t_{12}$. This implies that some sort of speech compression or information discarding has to occur. This is discussed more in detail further below. Here, we just notice that some speech compression takes place.

When the delay of the transfer of speech from user U1 to user U2 is reduced, the opposite direction will be allowed to use a higher part of the available delay budget. Accordingly, the delay of the transfer from U2 to U1 is increased, preferably gradually. In the present embodiment, this increase takes place in the time interval $\Delta t_{12}$, which means that the speech created at time $t_{25}$ will experience a transfer delay of 250 ms. The speech of U2 of the interval $\Delta t_{12}$ will arrive at user U1 during the interval $\Delta t_{13}$. Since the duration of $\Delta t_{13}$ is larger than the duration of $\Delta t_{12}$, a speech stretching procedure has to be applied. This is discussed in more detail below.

At time $t_{26}$, the speech of U1 ends, and the link from U1 to U2 becomes inactive. Since the transfer delay is 250 ms, the end of the speech arriving at U2 occurs at time $t_{27}$. One of the directions is now inactive, which means that, according to the present invention, a larger part of the available delay buffer can be utilized by the active link. Subsequently, during the time interval $\Delta t_{14}$, the transfer delay of information from U2 to U1 is increased from 250 ms to 350 ms. At the receiving side, the speech is received within time interval $\Delta t_{15}$, which means that once again, a speech stretching procedure has to be performed. Finally, the speech created by U2 at $t_{28}$ experiences a delay of 350 ms during the transfer to user U1.

At time $t_{29}$, user U1 becomes active again, and this onset of activity reaches user U2 at time $t_{30}$. This event once more trigs a dynamic adjustment of the delays of the data transfer on both directions.

At the bottom of FIG. 3, diagrams are illustrating the transfer delay employed in the different directions at the different occasions. It can be seen that the efficiency gain of the present invention basically vanishes when both users are talking at the same time. However, during the periods when only one user is talking, the invention creates overall advantages compared with prior-art systems.

From the above example, it is seen that the technology can be employed also when a true simultaneous full-duplex conversation occurs. Preferably, in such cases, mechanisms taking care of speech compression and speech stretching is used to make the speech presented to the users as smooth as possible, without any annoying losses or noticeable pauses.

By obtaining a determination of the information value carried by data in the different directions, a dynamic assigning of transfer modes, e.g. modes having different coding delays, can be performed. The coding delay thus becomes dependent on the determination of the value of the content of the transmitted data. The information value can be whether the link carrying the data is active or inactive. By determining the information value in both directions, periods in which only one direction is active can be determined. During such periods, transfer modes having a larger coding delay than conventionally used, can be utilized. The delay in an active link, when the opposite link is inactive, can thus be increased to a value exceeding half the requested maximum round-trip delay. However, the difference between such an enhanced delay and the maximum round-trip delay has to admit a delay caused by a reply transfer. This reply transfer may, however, have a very low coding delay, since it will only be utilized with a short duration.

The present invention can be used in conversational systems of different kinds. The transferred signals can represent audio signals as well as video signals. In the audio signal case, inactivity can e.g. be defined as silence, background noise and/or a constant time invariant signal. In the video case, inactivity can e.g. be defined as no image at all, background noise and/or a still. Common for these "inactivity" situations is that the information value of the transmitted data is none or very low, and that the content does not influence the receiver.

The invention can even be applied in multi-party communication systems (e.g. conferencing) with more than 2 participants. In this case typically one party is active and gets high coding delay on the links to all other (inactive) parties. In case of change of the active party, low coding delay is applied for the onset to be transmitted from the party that starts to be active to the previously (or even still) active party. On the link(s) from the new active party to the parties, which previously have been inactive, high delay can be used even for the onset.

In the above examples, three delay levels have been applied. However, any number of delay levels, larger than one, can be applied, as well as solutions based on continuous or pseudo-continuous delay level variations. The more number of delay levels available, the more efficient becomes the method, and the less troublesome becomes the compression/ stretching of data. Such plurality of coding delay levels is preferably based on a set of predetermined coding schemes.

The actual gain with the described solution can be further illuminated by two further examples, one involving packet-switched transmission and one involving circuit-switched transmission.

With the exemplified packet-switched transmission it is assumed that there is a total delay budget to be distributed between active and passive links of 400 ms. There is a given distribution of the packet transmission delays from sender to receiver which for simplicity reasons is assumed to be identical for both directions. A typical delay distribution can be assumed to have a high likelihood for small delays and a small but not zero likelihood for large delays. A state-of-the-art solution would assign a maximum of 200 ms to the jitter buffers of both communication directions. This would allow to properly decode all packets arriving within a window of 200 ms. All later packets would be regarded as lost packets. In this example, the delay distribution is assumed such that the likelihood for a packet not to arrive in time is 3%.

The active link could be assigned e.g. 350 ms. For the active link, the likelihood not to receive packet in time would be decreased, e.g. to 1% which leads to a quality improvement. For the inactive link there are two basic options. Either not more than the remaining 50 ms delay out of the delay budget would be used. This would lead to an increased packet loss rate, which, however, would be tolerable as it concerns the less important inactivity signal. Or, high coding delay (i.e. jitter buffer length) is maintained as long as the link is inactive. In any case, at the latest when the link starts to become active, the low delay of 50 ms would be binding since it carries a response in the conversation. The jitter buffer is adjusted accordingly upon reception of the first package carrying the speech onset. When the inactive link switches to the 50 ms alternative, the remaining information in the 350 ms jitter buffer may be discarded without any significant loss in information. In order to compensate for the loss in coding gain due to the short jitter buffer, more costly transmission techniques such as redundancy packet transmission and transmission in smaller packets can be applied for the onset. After such fast transmission of the onset, the coding delay, i.e. jitter buffer size, would be increased up to the delay for an active link of 350 ms, preferably as continuous as possible. At latest when the jitter buffer has reached its maximum length, packet transmission can be changed back to regular mode without extra redundancy and with regular size packets.

The gain of the solution in the example above is increased communication quality.

In an example of circuit-switched transmission, a total delay budget available for coding is assumed to be 125 ms. A state-of-the-art solution for a 2-party communication would distribute the budget evenly such that forward and backward links each obtain 62.5 ms of available coding delay. 25 ms would e.g. be used for source coding and 37.5 ms for channel coding including interleaving. It is further assumed that transmission on the active link requires a power level $TX_{lev\_A\text{-}B}$ in order to achieve a frame erasure rate of 0.5%. On the inactive backward link DTX is used with an average power level of ⅛ of $TX_{lev\_A\text{-}B}$. A solution according to the invention could be to increase the delay on the active link to 82.5 ms and to decrease it on the inactive link to 42.5 ms. This may e.g. lead to an increased coding gain on the active link by 1 dB, while the coding gain on the inactive link is decreased by 3 dB. The same transmission performance is thus achieved with 1 dB reduced power on the active link and 3 dB increased power on the inactive link. The total transmission power budget considering both forward and backward communication links decreases from $$(1+\tfrac{1}{8})*TX_{lev\_A\text{-}B} = 1.125*TX_{lev\_A\text{-}B}$$

to $$\left(1*10^{-1/10} + \tfrac{1}{8}*10^{3/10}\right)*TX_{lev\_A\text{-}B} = 1.044*TX_{lev\_A\text{-}B}$$

It can thus be concluded that the solution provides the system with an overall gain that e.g. can be used for increasing the capacity.

The achievable gain is even higher (total transmission budget=$0.919*TX_{lev\_A\text{-}B}$) considering that higher coding delay is acceptable for the inactivity signal. The coding delay for the inactivity signal does not need to be reduced and no loss in coding gain needs to be compensated. In this case it has to be made sure that the delay budget is not exceeded when the inactive link starts to be active as it carries a response in the conversation. In order to ensure proper transmission of the signal onset of the link becoming active despite low coding delay, it is possible to compensate for the reduced coding gain by (temporarily) increasing the transmission power. After the fast transmission of the onset the coding is switched to more efficient coding with higher delay. The switching to higher delay coding requires the output signal to be stretched in time. This can be done according to any state-of-the-art time scale modification algorithm.

In principle, the basic ideas of the present invention could be applied autonomously on each communication direction. If the link is active, coding delay is increased up to some maximum. If the link just becomes active, the delay is decreased down to some lower limit and is subsequently increased. These solutions would work independent of the communication of the opposite direction as long as only one link is active at a time, i.e. according to the example illustrated in FIG. 2. Here, only the activity level in one communication link is necessary to know. Such a solution does indeed provide for keeping the total requested response time at the onset of an activity period, which is the most important instant for a user to react on delays. However, such solutions do not provide full control over the response time in certain conditions when both links are active at the same time. The response time will then exceed a predefined maximum limit since both links apply long coding delay.

As a solution to this problem, as illustrated e.g. by FIG. 3, a response time control mechanism can be applied. Such a mechanism ensures that the response time never exceeds a predefined limit. It firstly requires measuring the amount of activity or delay in both communication directions and secondly requires adapting the maximum allowed delay for activity.

A simple solution is to derive the required measurements based on the activity status of both links. This is possible at each communication end provided that both links are symmetric in terms of available coding delay for activity signals. Detecting both incoming and outgoing links to be active at the same time allows to assume that the total used coding delay is twice the coding delay caused at each communication end. The delay caused by each end is obviously available to each end.

A more universal but more demanding method is to exchange side information between the communication ends about the presently used coding delay at each end or to make true round-trip delay measurements for which e.g. RTCP (IETF RFC 1889) pp. 24-27 provides support.

If the measured total coding delay exceeds the allowed coding delay budget, then the maximum allowed coding delay for activity has to be adapted, e.g. as in connection with FIG. 3 further above. One simple possibility is to assign to each link half of the coding delay budget.

Figure 4:
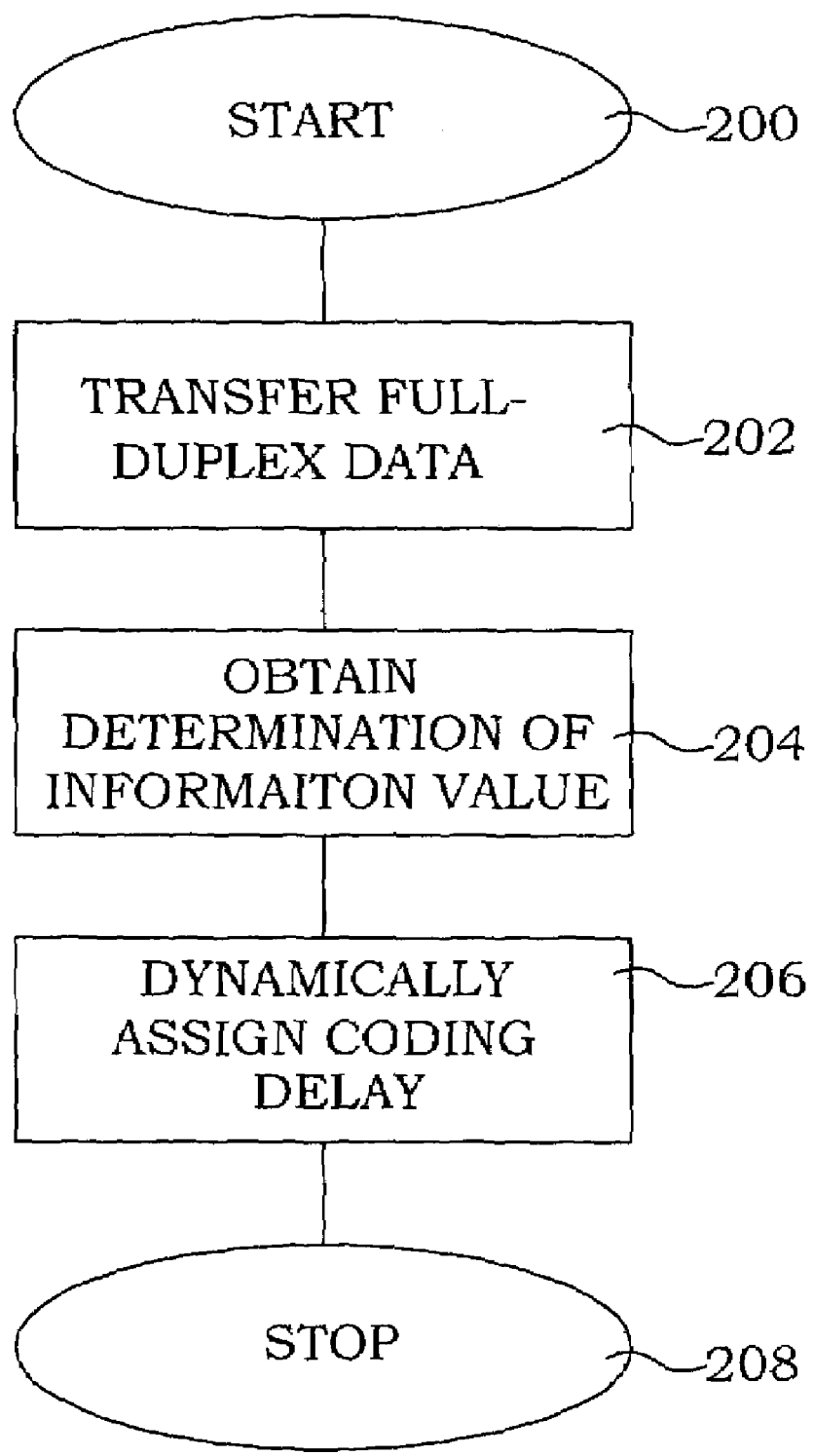
FIG. 4 is a flow diagram illustrating a general method.

A general method can be illustrated by the flow diagram of FIG. 4. The procedure starts in step 200. In step 202, a full-duplex transfer of data is performed. A determination of the information value of the transferred data is obtained in step 204, preferably in terms of activity and inactivity. Finally, in step 206, the determination is used for dynamically assigning appropriate coding delays. A higher coding delay is assigned when the link is active, at least when the link in opposite direction is inactive. Furthermore, preferably, a lower coding delay is assigned at the onset of activity. The procedure ends in step 208.

Figure 5:
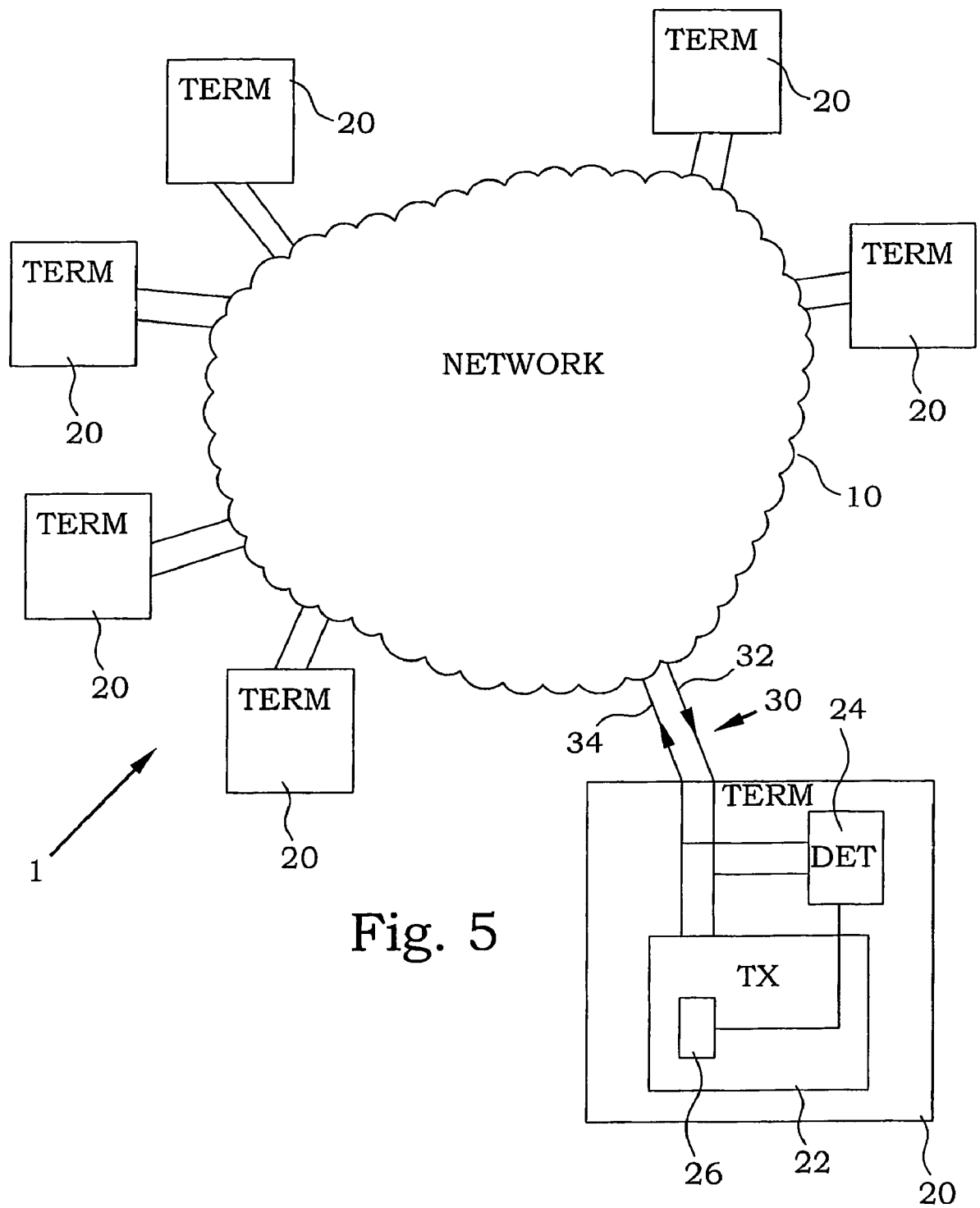
FIG. 5 illustrates a communication system.

FIG. 5 illustrates an embodiment of a communication system 1 for full-duplex communication of conversational services. The communication system 1 comprises a network 10, connecting a number of user terminals 20, of which only a few are illustrated. The user terminals 20 are connected by a full-duplex connection 30 comprising an incoming connection 32 and an outgoing connection 34. The outgoing and incoming connections 32, 34 can be implemented as common or separate means. The user terminal 20 comprises a transceiver means 22, responsible for transmitting and receiving data on the outgoing and incoming connections, respectively. This transceiver means 22 comprises e.g. means for transferring data in a full duplex manner, coding/decoding means etc. necessary for the particular network to which the terminal 20 is connected. The transceiver means further comprises transfer mode control means 26, responsible to select a transfer mode of the incoming and/or outgoing traffic. These transfer modes can comprise different coding, buffering etc. The terminal 20 further comprises a detector 24 for determination of the information value carried by data in the full-duplex connection 30. In this embodiment, the detector 24 comprises an activity detecting means connected to determine activity in the outgoing connection 34 as well as in the incoming connection 32. The detector 24 is connected to the transfer mode control means 26 of the transceiver means 22. The transfer mode control means 26 is according to the present invention arranged to dynamically assign transfer modes according to the determination of the detector 24. In this embodiment, both links in the communication are monitored regarding activity level, which enables a true response time control.

Figure 6:
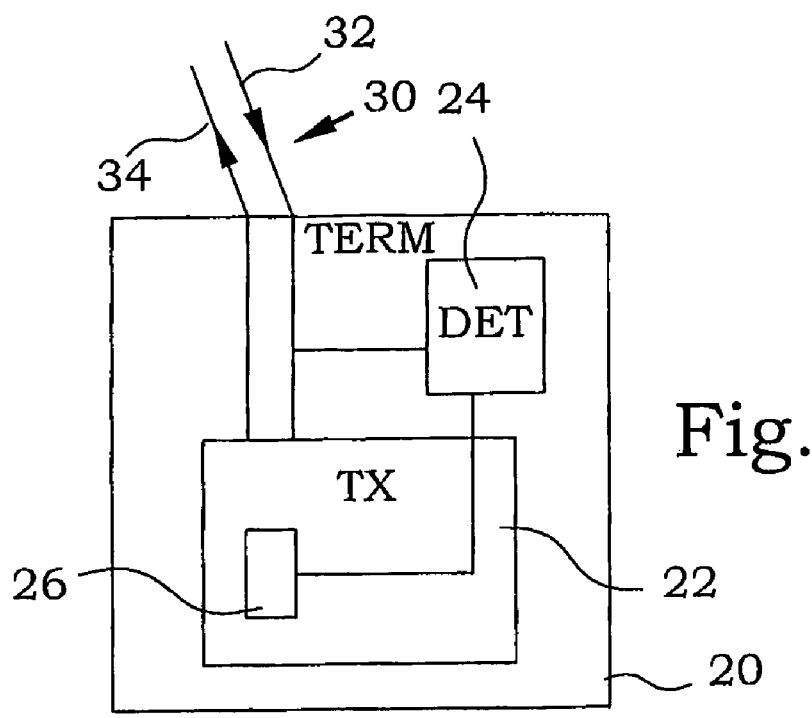
FIG. 6 illustrates a user terminal.

In FIG. 6, another embodiment of a user terminal 20 is depicted. Here, the detector 24 is only arranged to monitor one of the links regarding activity. In such a case, if no further information is exchanged within the system, a response time control is only ensured at the onset of an activity period.

Figure 7:
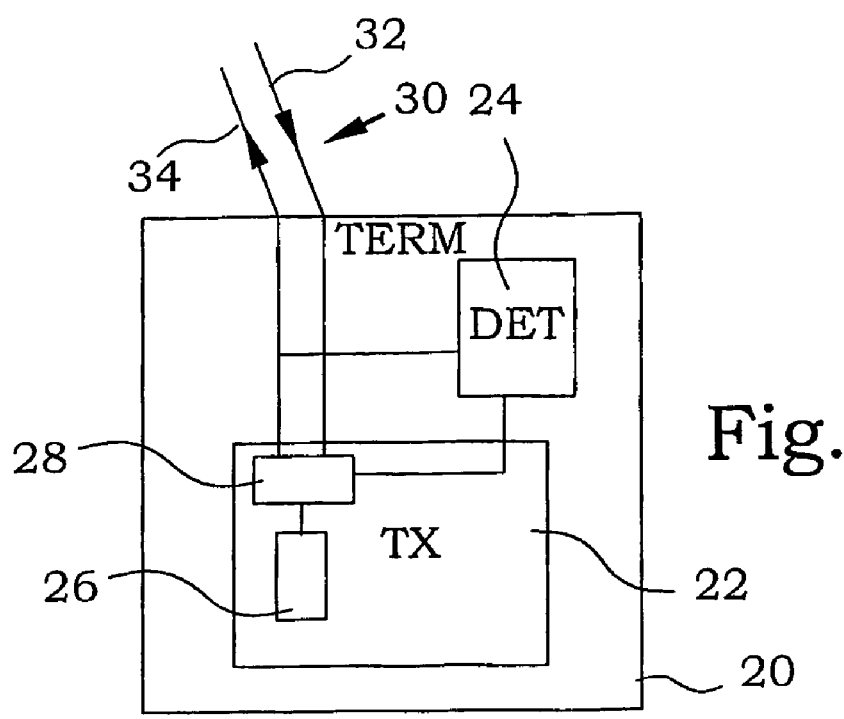
FIG. 7 illustrates another user terminal.

In FIG. 7, yet another embodiment of a user terminal 20 is illustrated. Here, the detector 24 does only monitor the outgoing connection regarding activity. However, in this embodiment, the transceiver means 22 further comprising means 28 for exchange of delay-related information. The means 28 for exchange of delay-related information is arranged to receive control signaling concerning delay issues. For instance, the other user terminal could transfer a message that a certain transfer mode having a particular delay is applied. Such information, together with the information of the activity on the outgoing connection 32 achieved through the detector 24 enables the transfer mode control means 26 to select an appropriate delay for the outgoing data. Preferably, the means 28 for exchange of delay information also converts the result from the detector 24 to control signals, which are transferred to the opposite user terminal.

Figure 8:
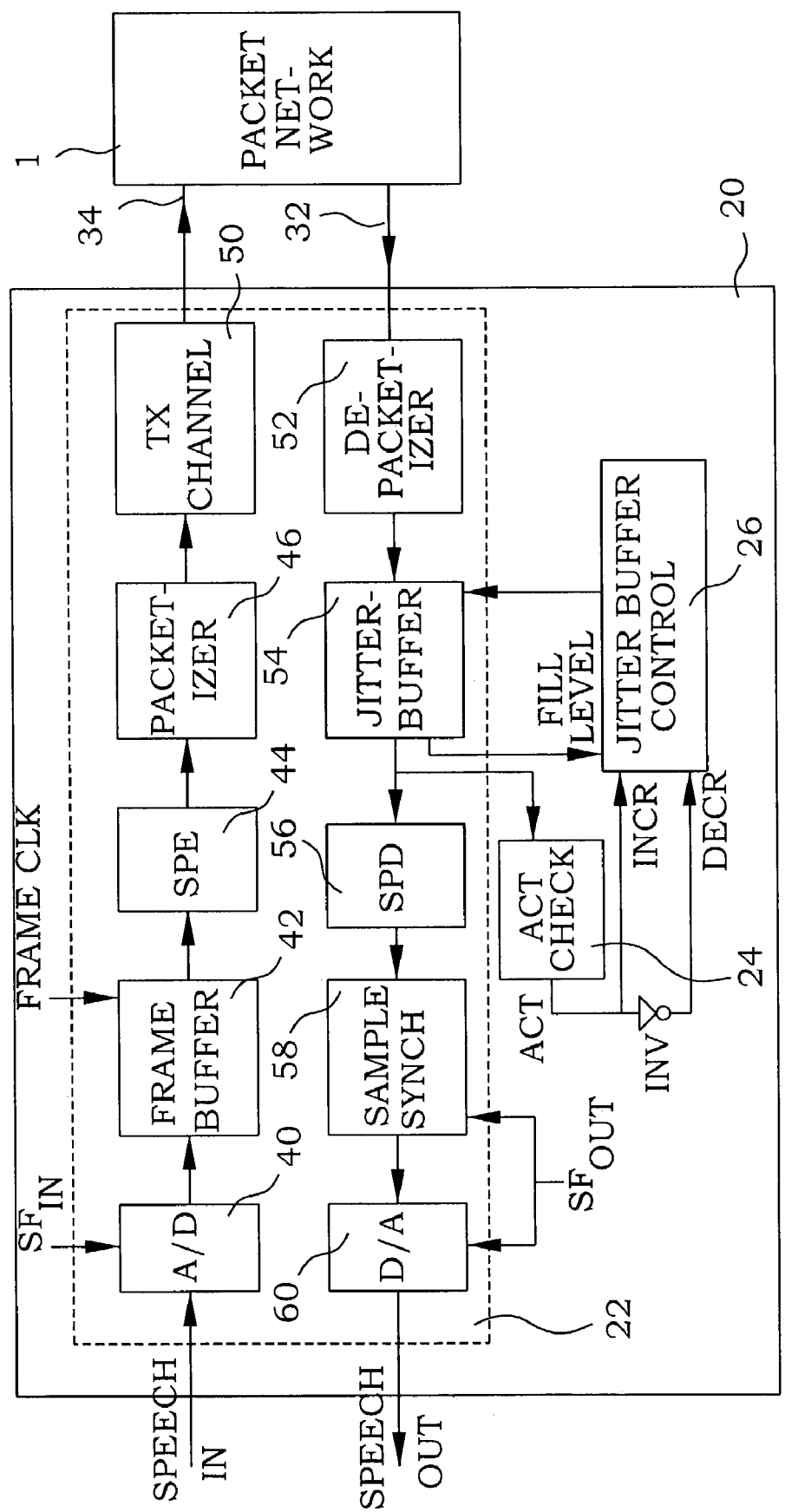
FIG. 8 illustrates a detailed embodiment of a user terminal giving a low delay for inactive links.

FIG. 8 illustrates an embodiment of a terminal 20. The transmission system in this embodiment is assumed to operate with packet switched transmission, i.e. the communication network 10 is in this embodiment a packet network. Furthermore, communication between two terminals according to FIG. 8 or having a corresponding functionality is assumed. The incoming speech (SPEECH IN) presented by an user, is provided to the terminal 20. An A/D converter 40 digitizes the incoming analogue signal and puts out a digitized signal sample by sample with a certain sampling rate ($SF_{IN}$) of e.g. 8 kHz. As efficient speech codecs usually work on frame basis, there is a frame buffer 42 in the front of a speech encoder (SPE) 44, which collects frames of samples (of e.g. 20 ms length), which are then processed by the SPE 44. The framing is controlled by a framing clock signal (FRAME CLK). The SPE 44 operates on frame basis and outputs coded speech data. The coded speech data, which each set of data represents a speech frame, is then propagated to a packetizer 46, which collects a number of speech data frames to form one speech data packet and adds a packet header. The packet is then transmitted over a transmitter channel 50 via the outgoing link 34 over the packet network 10.

The transmission over the network is characterized by a certain delay profile, which causes each packet to be delayed according to some statistical delay distribution with some minimum transmission delay of e.g. 50 ms. Also, a certain proportion of the transmitted packets will be lost and never arrive at the incoming link 32 at the receiving end.

At the receiver, the arriving packets are fed into a depacketizer 52 and then a jitter buffer 54, which purpose is to transform the discontinuous input stream of packets into a continuous stream of speech data frames which can be decoded by a speech decoder (SPD) 56. The jitter buffer 54 outputs speech data frames in response to an output clock signal, which is described below. The SPD 56 decodes the speech data frames and outputs in response to them the decoded speech frames to a sample synchronizer 58. The sample synchronizer 58 is in its simplest form a buffer with a buffer control mechanism which puts out the speech samples at a given sampling frequency ($SF_{OUT}$) to a D/A converter 60, which in turn generates the analogue speech output signal (SPEECH OUT). A sample synchronizer may simply insert or discard samples or also handle more advanced speech compression or stretching procedures. This is discussed more in detail further below.

There are two basic ways to control the jitter buffer operation. A simple way is to set the output clock to such a submultiple of the D/A converter clock $SF_{OUT}$ that it is equal to the speech codec frame rate of e.g. 20 ms. This means that the sample synchronizer reduces to a mere parallel to serial converter and no sample insertion or deletion is necessary. In order to ensure sender/receiver frame synchronization the jitter buffer control comprises means to insert or discard speech data frames depending on if the average (some short-term average) buffer fill level is lower or higher than a certain target jitter buffer level.

A second way of jitter buffer control is to manipulate the jitter buffer output clock. This method has the advantage that sender/receiver synchronization is done on sample rather than on frame basis. In normal operation (if there is no change in communication direction), ideally the frequency of the jitter buffer output clock corresponds to the clock frequency with which the SPE 44 generates speech data frames. In practice, however, this clock is derived in the receiver by certain control mechanisms comprised in a jitter buffer control means 26, which mechanisms are based on the jitter buffer state, e.g. the fill level. There are known methods to control the jitter buffer clock which typically control the clock such way that the average fill level of the jitter buffer 54 is constant as in the previously described jitter buffer control method.

It is important to highlight the relationship between average jitter buffer level and delay; a low average jitter buffer level corresponds to low end-to-end delay while a high average jitter buffer level corresponds to long delay. A low average jitter buffer level and delay gives rise to many speech frame losses due to high likelihood of jitter buffer underflow, a high average jitter buffer level and delay results in a reduced number of frame losses and thus to increased speech quality at the receiver.

In an example of a typical end-to-end delay involved with the described transmission system the following main contributors can be identified neglecting other less relevant contributors such as e.g. processing delays:

1. speech frame buffer—20 ms.
2. packetizer with 2 speech data frames—20 ms.
3. packet delay from output of packetizer to output from jitter buffer of first speech data frame of the packet—100 ms or 300 ms, alternatively, comprising:
   3a. packet transmission delay according to a certain delay profile with minimum transmission delay of 40 ms.
   3b. jitter buffer and de-packetizer compensating for packet delay variations with jitter buffer depth of 3 speech data frames (=60 ms) or 13 speech data frames (=260 ms), alternatively.
4. sample synchronization buffer—10 ms.

The end-to-end delay is thus 150 ms or 350 ms depending on the jitter buffer depth.

Assume that the user of the present terminal is silent, but that active speech is received from another terminal. On the incoming link 32, there is transmission of active speech, while on the outgoing link there is only transmission of a coded silence signal (background noise). Consequently, the incoming transmission has to be as efficient as possible, meaning that as much available coding delay as possible is allocated to this link. Typically, the receiver jitter buffer uses this coding delay, i.e. it works with a deep jitter buffer of 13 speech data frames resulting in an end-to-end delay from sender to receiver of 350 ms. Due to this high delay, the reproduced speech quality at the receiver is high. In the opposite direction, a configuration with small jitter buffer depth is used causing an end-to-end delay of 150 ms.

Now, consider the communication direction to change. Firstly, the other side becomes inactive. This causes the frames transmitted on the incoming link 32 to contain coded silence signal. The corresponding frames are marked with a corresponding silence flag, assuming that there is a VAD at the sending side. Alternatively, as illustrated in the present embodiment, the terminal 20 may employ a VAD or other activity detector 24 in connection to the SPD 56 and derive this flag locally. Upon the silence flag being active, a signal to the jitter buffer control means 26 is generated decreasing the jitter buffer depth down to its minimum of 3 frames. As a consequence, the end-to-end delay decreases. The decrease of the jitter buffer depth is accomplished either by dropping frames or by increasing the jitter buffer clock. An increased jitter buffer clock further causes the SPD 56 to produce more decoded silence frames per time unit which in turn fills the sample synchronization buffer. This will cause a simple sample synchronization procedure to discard excess samples. As the discarded samples are silence signal samples, this signal modification is hardly audible.

Secondly, the user of the present terminal 20 becomes active. As the outgoing link 34 was inactive before, the jitter buffer depth at the receiver is low. Thus, the active speech onset is transmitted with only 150 ms end-to-end delay. The resulting response time is thus 500 ms. However, as the jitter buffer depth in the opposite receiver is only low, the frame loss rate is increased and the resulting speech quality would be low. In order to compensate for this, a higher transmission resource is used for speech onset transmission, i.e. for the first n speech frames after a period of silence. n may e.g. be 100, corresponding to 2 seconds in time. An onset signal controlling this behavior can e.g. be derived from a speech activity flag obtained by a VAD in the outgoing link. A higher transmission resource is used e.g. by sending packets comprising only one instead of two speech data frames and/or transmitting each packet twice. Reducing the number of frames per packet has the additional advantage that it further reduces the end-to-end delay. The opposite receiver, upon reception of active speech frames, either marked by a flag generated by the encoder VAD or by a local decoder VAD 24 employed in connection to the SPD 56, starts to build up jitter buffer depth. This is accomplished either by inserting additional frames into the jitter buffer (e.g. by frame repetition) or by taking the active speech frame flags as signal for the jitter buffer control means 26 to decrease the clock until the jitter buffer depth has reached its maximum of 13 frames. In the former case, additional frames can be generated by e.g. repetition of existing frames. Preferably, in order not to impact the resulting speech quality, those frames are repeated, which convey noise-like speech parts or speech parts with low level. As a consequence of the latter case, the SPD 56 will in a given time produce less decoded speech frames which in turn causes the sample synchronization buffer fill level to decrease. A simple sample synchronization method could then insert samples, e.g. by sample repetition in order to avoid sample synchronization buffer underflow. More elaborate methods are further discussed below. In this example, the speech modification and accumulation of jitter buffer delay takes 2 s implying a time modification of the speech of 10%.

The embodiment of FIG. 8 thus causes a low delay of an inactive link and a high delay of an active link, without any particular round-trip delay control.

Figure 9:
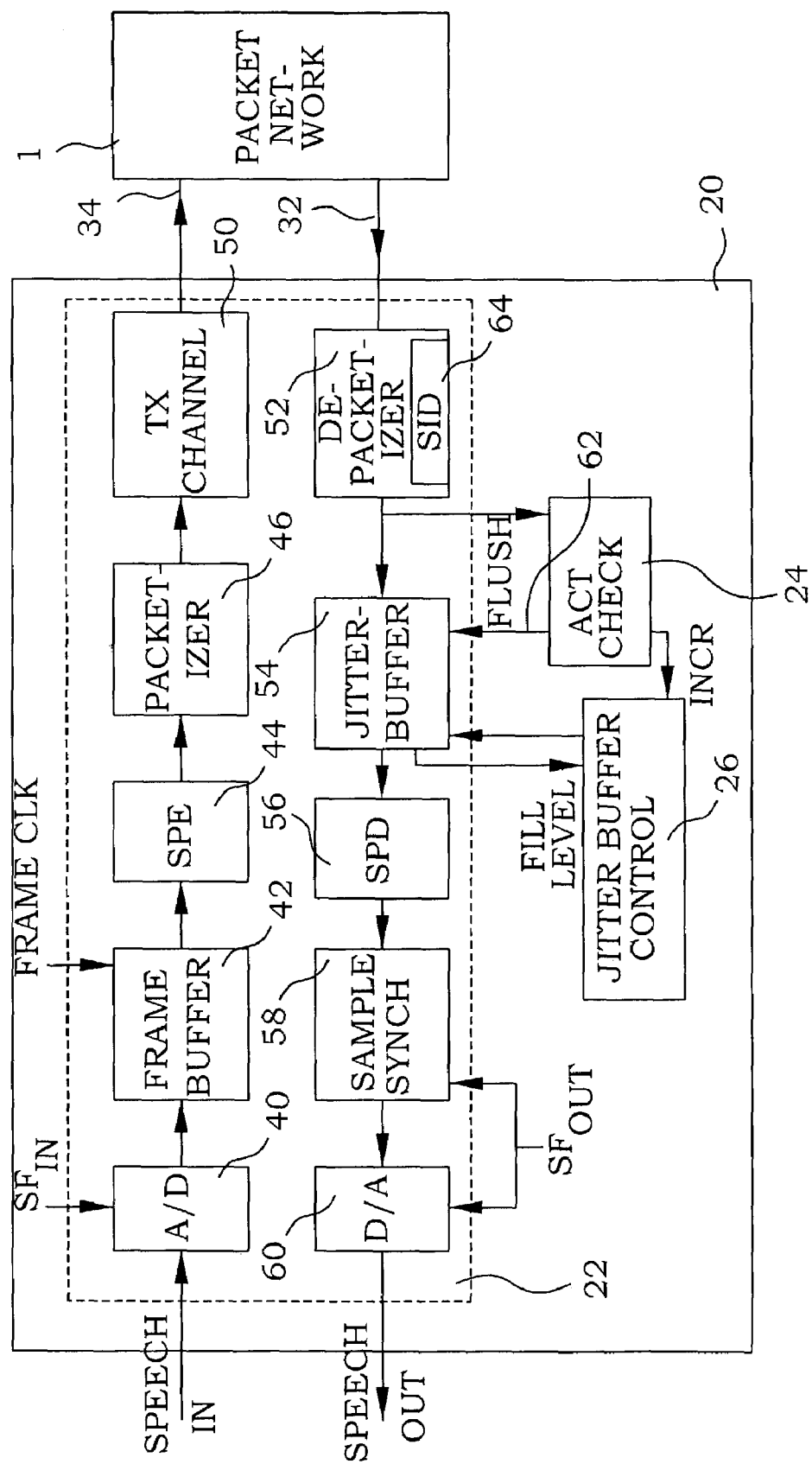
FIG. 9 illustrates another detailed embodiment of a user terminal giving a high delay for inactive links.

FIG. 9 illustrates another similar embodiment of a terminal 20 according to the present invention. Parts that are the same as in previous embodiments are given the same reference numbers and are not further discussed, if not of particular importance for the operation of the present embodiment. The transmission system in this embodiment is assumed to be the same as for the embodiment in FIG. 8. The main differences of the embodiment of FIG. 9, compared with the embodiment of FIG. 8 are that the activity checking means 24 is connected to determine the activity of the incoming link before the jitter buffer 54, and that the activity checking means 24 has a direct control connection 62 to the jitter buffer 54. The de-packetizer 52 also comprises a SID converter 64.

Assume that the incoming link is active, and the outgoing link is inactive. On the incoming link, there is transmission of active speech while on the outgoing link there is only transmission of a coded silence signal. Consequently, the handling of the incoming traffic has to be as efficient as possible, meaning that as much available coding delay as possible is allocated to this link. Typically, the receiver jitter buffer uses this coding delay, i.e. it works with a deep jitter buffer of 13 speech data frames resulting in an end-to-end delay of 350 ms. Due to this high delay, the reproduced speech quality at the receiver is high. In the outgoing direction, the end-to-end transmission delay for the silence signal is 350 ms as well.

If now the incoming link becomes inactive, this does not in the present embodiment cause any jitter buffer modification at all and thus no change of the end-to-end delay.

Assume instead that both links are inactive, both having a deep jitter buffer. Now, the incoming link becomes active. In order to get a low response time, the reception of the first active speech frame causes the jitter buffer to be flushed down to the low jitter buffer depth of 3 frames. As the discarded frames are mere silence signal frames, this does not have significance for the reconstructed signal at the receiver. The check for active speech is in this embodiment done immediately after de-packetization and can be done based on an activity flag (generated by an encoder VAD) or locally by a decoder VAD 24, as illustrated in the figure. The VAD 24 is here arranged to directly flush the jitter buffer 54. Due to the flushing of the jitter buffer down to the lower jitter buffer depth, the jitter buffer delay has been reduced almost instantaneously to the lower limit and consequently the active speech onset is transmitted with only 150 ms end-to-end delay. The resulting response time is thus 500 ms. Again, an increased frame loss rate may be compensated by increasing the use of transmission resources. After the initial flush and decrease of jitter buffer depth, upon reception of active speech frames, the receiver jitter buffer depth is subsequently started to build up again. This is accomplished by taking the active speech frame flags as signal for the jitter buffer control means to increase the jitter buffer depth once more up to its maximum of 13 frames. As before, either additional speech frames have to be inserted or the sample synchronizer 58 has to compensate for a decreased speech frame rate.

The present embodiment does also comprise a DTX functionality. This means that instead of transmitting actual background noise, there is an occasional transmission of comfort noise frames. The actual end-to-end transmission delay for this silence may even exceed 350 ms, as the noise frames are transmitted only occasionally, e.g. once every eighth frame (once every 160 ms). The handling of this case becomes identical to the situation without DTX if the de-packetizer additionally comprises a SID (Silence Descriptor) frame converter 64, which converts the discontinuous stream of incoming SID frames into a sequence of continuous silence signal frames. Each incoming SID frame is then replaced by eight SID frames with one SID frame per 20 ms. In this comfort noise parameter interpolation may take place which usually is done in the comfort noise synthesis of the SPD.

Figure 10:
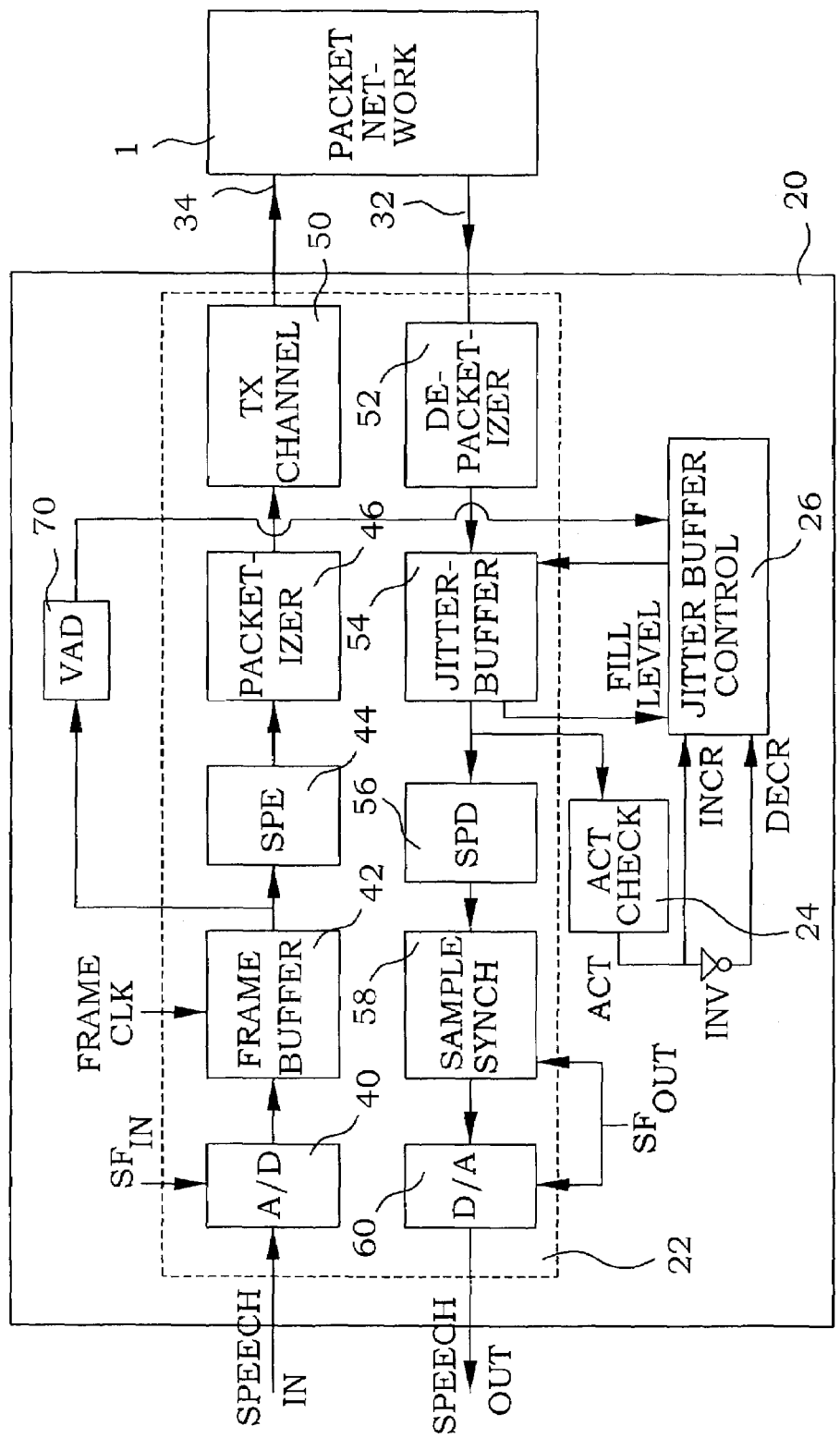
FIG. 10 illustrates a detailed embodiment of a user terminal giving a low delay for inactive links and having response time control.

FIG. 10 illustrates another similar embodiment of a terminal 20. Parts that are the same as in previous embodiments are given the same reference numbers and are not further discussed, if not of particular importance for the operation of the present embodiment. This embodiment introduces a solution for a double talk response time control. The principle is to sense the speech activity in the transmitting end as well and to propagate the sending side activity flag to the jitter buffer control means 26 in addition to the activity flag belonging to the received signal. This is achieved by providing e.g. a VAD 70 arranged to sense the situation at the transmitting end and connected to the jitter buffer control means 26. In case of both flags signaling active speech, the jitter buffer control means 26 steers the jitter buffer depth to the average between the maximum and the minimum possible jitter buffer depth, i.e. in the present embodiment 8 frames. If the present jitter buffer depth is lower than 8 frames, then frames are inserted or, respectively, the jitter buffer clock is decreased, if it is higher than 8 frames, then frames are discarded or, respectively, the clock is increased.

The jitter buffer control means 26 may also comprise means for postponing the increase of the jitter buffer depth for a predetermined time period, in order for allowing the opposite side to start to adjust for changes in activity in the different links.

Figure 11:
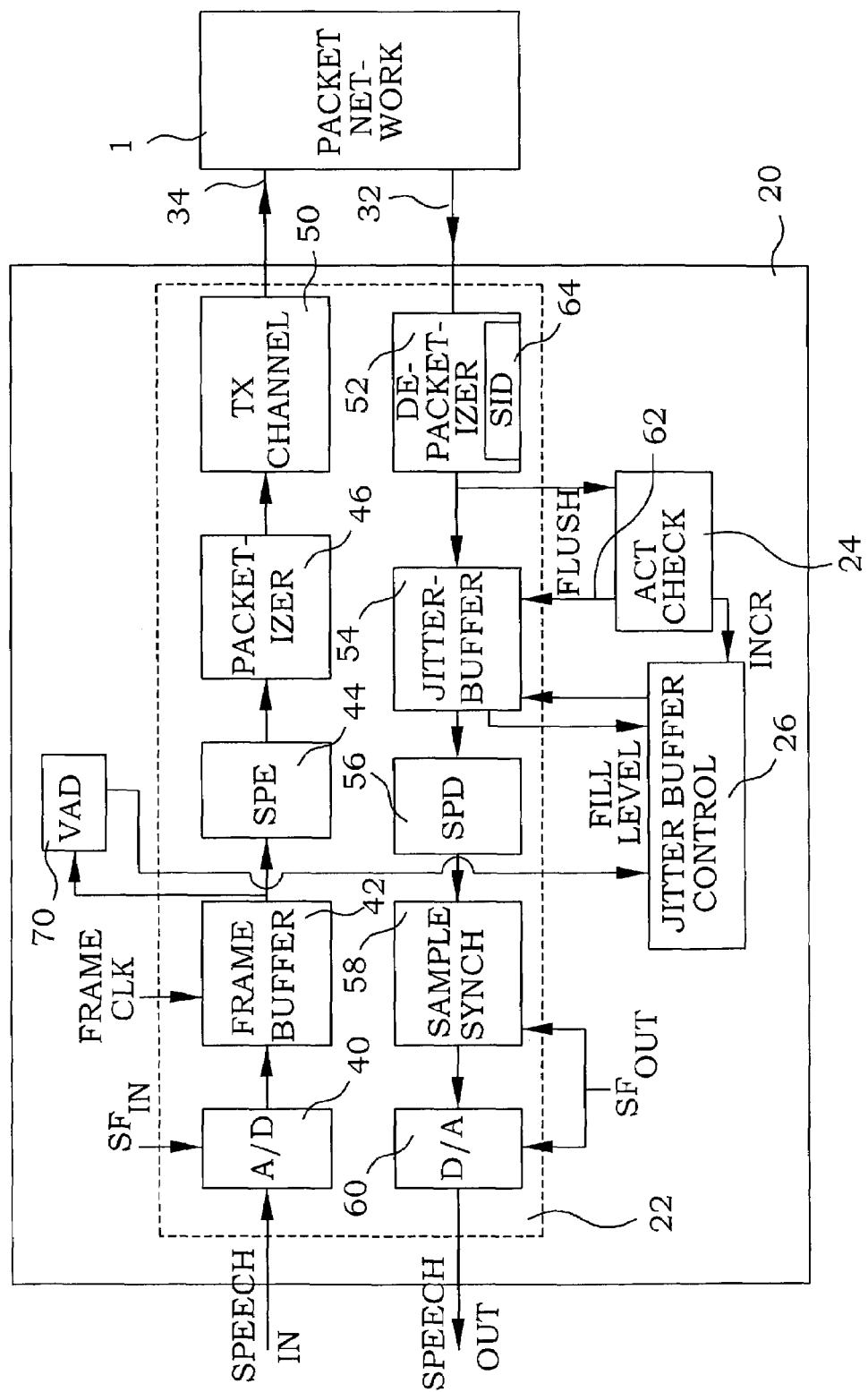
FIG. 11 illustrates a detailed embodiment of a user terminal giving a high delay for inactive links and having response time control.

In FIG. 11, a similar double talk response time control is introduced into a system having a high delay of the inactive link, c.f. FIG. 9.

The examples discussed so far allow distributing a total available coding delay budget among the two links depending on the respective activity status and thereby to guarantee a certain response time. In general, however, these methods do not allow maintaining a given absolute response time. A reason for this is that in general the packet transmission delay through the packet network is unknown. The solutions given so far are based on the jitter buffer state rather than on the true response time. In order to guarantee a certain absolute response time, it is necessary to estimate the true transmission time. This can e.g. be done by round-trip delay measurements in which a message is transmitted from one side A to the other B and after reception at side B, possibly at jitter buffer output, it is replied to side A. Such a measurement can of course be done at both sides. Based on such round-trip delay measurement, the true response time can easily be derived and the maximum and minimum target jitter buffer depth can be adjusted accordingly. If e.g. the round-trip delay measurement leads to a true response time of 600 ms instead of the required 500 ms, the target jitter buffer depths need to be reduced. The minimum target jitter buffer depth could e.g. be lowered to 2 speech data frames (=40 ms), and the maximum target jitter buffer depth down to 9 frames (=180 ms) with which in total 100 ms in response time are saved.

Figure 12:
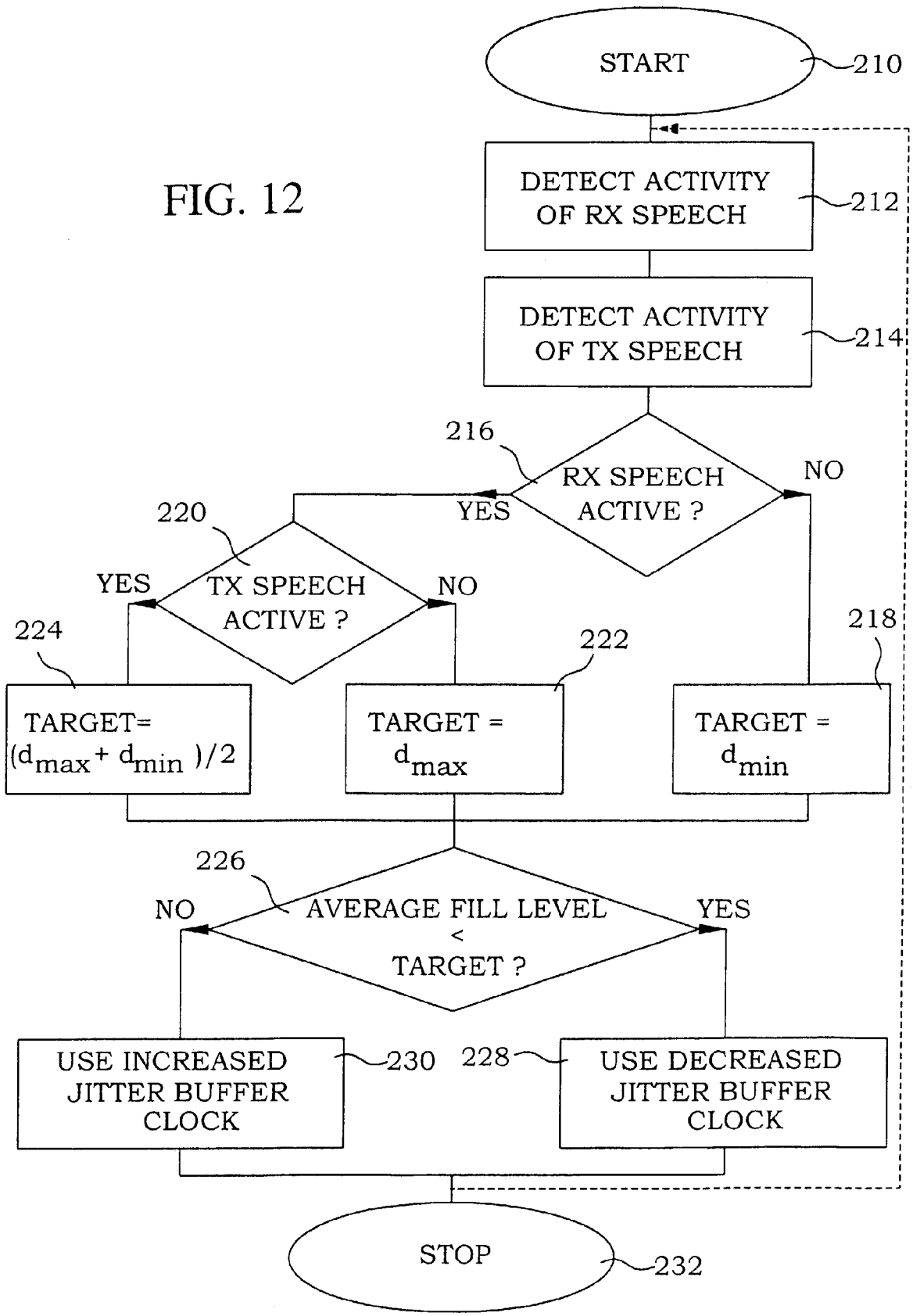
FIG. 12 illustrates a flow diagram of an embodiment of jitter buffer control.

The last embodiments rely on a proper jitter buffer control. Its basic principle will be discussed in the following in connection with a flow diagram illustrated in FIG. 12. This flow diagram corresponds to the embodiment of FIG. 10, if not specified differently. The procedure starts in step 210. In general, the jitter buffer control is done such that a certain target jitter buffer depth is met depending on the activity of the received and possibly of the transmitted speech signals. In step 212, any activity flag of received speech is detected. In step 214, any activity flag of transmitted speech is detected. A primary input to the logic is the activity flag of the received speech. In step 216 it is checked if there is an activity flag for the received speech. If the received signal is not active speech, then the target jitter buffer depth will be set to a minimum target jitter buffer depth $d_{min}$ in step 218. In cases the total delay budget is not kept constant, e.g. according to FIG. 9, the target jitter buffer is instead left unchanged.

If the flag in step 216 indicates activity, the procedure continues to step 220, in which it is checked if there is an activity flag for the transmitted speech. If the transmitted signal is not active speech, then the target jitter buffer depth will be set to a maximum target jitter buffer depth $d_{max}$ in step 222. If, however, the transmitted signal is active speech, then the target jitter buffer depth will be set to an average target jitter buffer depth of $(d_{min}+d_{max})/2$ in step 224. If no response time control is applied, e.g. as in FIG. 8, step 222 is always selected.

The target jitter buffer depth derived as described above is then compared to the average jitter buffer fill level in step 226. If the average fill level is less than the target, additional frames are inserted (e.g. by repetition) or the jitter buffer output is clocked with a decreased clock rate in step 228. If the average fill level is higher than the target, frames are discarded from the buffer or the jitter buffer output is clocked with an increased clock rate in step 230. In an alternative embodiment, step 228 instead comprises inserting of frames to increase the fill level, and step 230 instead comprises discarding of frames to decrease the fill level. The procedure is ended in step 232. Although the present flow diagram is presented having a start and stop, the control procedure is essentially continuous, why the actual flow typically follows the broken arrow back to step 212.

It is important to point out that it is natural to deploy the described control of the jitter buffer targets at the receiving side. This is the case since the comparison with the average jitter buffer depth is easiest done at the receiver. However, it is not impossible to deploy a corresponding clock control at the sending side with either speech frame insertion (e.g. repetition) and deletion or with controlling the output clock of the frame buffer. In the latter case, the frame buffer needs to comprise a time scale modification of input speech signal, which allows to clock out speech frames at varying clock rates without speech quality degradation.

The activity detectors can e.g. be of the same kind as is used in conventional DTX applications. However, any kind of sensors determining the value of the informational content of the transmitted and/or received signals may be used. For determining speech activity a VAD algorithm e.g. according to 3GPP TS 26.094 (Rel-4, V.4.0.0), pp. 7-15 can be used. For determining video activity algorithms can be based on the difference between consecutive video frames. Low differences are e.g. a signal for inactivity.

As mentioned above, sample synchronization means may be used for performing speech stretching and speech compression in a primitive manner. Speech stretching can e.g. be performed by for instance repeating samples or complete frames when needed. Speech compression can e.g. be performed by discarding speech samples or frames when needed. The speech quality will in such cases be influenced. However, if the degree of speech stretching is limited, the degradation of the speech will not be very particular. More elaborate methods, such as time scale modification would stretch or compress the decoded speech signal that the speech modification is hardly audible at all. If, for example, the speech modification and accumulation of jitter delays takes 2 seconds, a time scale modification for a delay change of 200 ms would be only 10%. It is further advisable to perform the time scale modification in those parts of the speech where it is hardly audible, e.g. in noise like parts, in low-level parts or by repeating/discarding complete pitch cycles. A state-of-the-art method for time-scale modification of speech is described in "Adaptive playout scheduling and loss concealment for voice communication over IP networks", IEEE Transactions on Multimedia, April 2001 by Yi J. Liang, N. Färber, and B. Girod.

It will be understood by those skilled in the art that various modifications and changes may be made to the present invention without departure from the scope thereof, which is defined by the appended claims.

The invention claimed is:

1. A method for full-duplex communication, comprising:
transferring data in a first direction and in a second direction;
obtaining a determination of an information value carried by said data in said first direction, said determination including a first determination of whether said data in said first direction corresponds to activity or inactivity; and
dynamically assigning coding delay in said first direction dependent on said determination of said information value and said first determination.

2. The method according to claim 1, wherein a higher coding delay is assigned for a higher information value.

3. The method according to claim 1, further comprising:
transmitting with lower allocated transmission resource when applying higher coding delay;
said transmission resource being one in the group of:
transmission power;
bit rate used for transmission;
number of packets used for transmission; and
number of allocated transmission channels.

4. The method according to claim 1 wherein:
said dynamically assigning comprises controlling said coding delay in said first direction to approach a maximum coding delay if said first determination corresponds to activity.

5. The method according to claim 4, wherein:
said approach is a gradual approach.

6. The method according to claim 5, wherein:
said dynamically assigning further comprises setting said coding delay in said first direction to a minimum coding delay at an onset of a period where said first determination corresponds to activity.

7. The method according to claim 6, further comprising:
transmitting with higher allocated transmission resource when applying lower coding delay;
said transmission resource being one in the group of:
transmission power;
bit rate used for transmission;
number of packets used for transmission; and
number of allocated transmission channels.

8. The method according to claim 6, wherein:
said gradual approach is delayed until a predetermined time after said onset.

9. The method according to claim 4, wherein:
said approach takes place via a plurality of predetermined coding delay levels.

10. The method according to claim 9, wherein:
said coding delay levels are based on a set of predetermined coding schemes.

11. The method according to claim 1, wherein:
said dynamically assigning step comprises the step of controlling said coding delay in said first direction to approach a minimum coding delay if said first determination corresponds to inactivity.

12. The method according to claim 1, wherein:
said full-duplex communication has a requested maximum round-trip delay;
said obtaining step further comprises a second determination of whether said data transferred in said second direction corresponds to activity or inactivity; and said dynamically assigning step comprises dynamically assigning coding delay in said first direction dependent on both said first determination and said second determination.

13. The method according to claim 12, wherein:
said dynamically assigning step further comprises the step of controlling said coding delay in said first direction to approach a maximum coding delay if said first determination indicates activity and said second determination indicates inactivity.

14. The method according to claim 13, wherein:
said dynamically assigning step further comprises the step of controlling said coding delay in said first direction to approach an intermediate coding delay if said first determination and said second determination both indicate activity.

15. The method according to claim 14, wherein:
said intermediate coding delay gives a total delay of said transfer of data in said first direction that is essentially half of said requested maximum round-trip delay.

16. The method according to claim 13, wherein:
said dynamically assigning step further comprises the step of setting said coding delay in said first direction to a minimum coding delay at an onset of a period where said first determination indicates activity.

17. The method according to claim 16, wherein:
said maximum coding delay gives a first total delay of said transfer of data in said first direction;
said minimum coding delay gives a second total delay of said transfer of data in said first direction;
a sum of said first and second total delay is essentially equal to said requested maximum round-trip delay.

18. The method according to claim 16, wherein:
said maximum coding delay gives a first total delay of said transfer of data in said first direction;
said minimum coding delay gives a second total delay of said transfer of data in said second direction;
a sum of said first and second total delay is essentially equal to said requested maximum round-trip delay.

19. The method according to claim 16, further comprising:
measuring an actual response time for a message to be sent forward and back in said full-duplex communication;
adapting said minimum and maximum coding delays for making said actual response time equal to said requested maximum round-trip delay.

20. The method according to claim 13, wherein:
any increase in coding delay is postponed a predetermined time period.

21. The method according to claim 1, wherein said data represents audio signals, whereby inactivity is defined as at least one of:
silence;
background noise; and
constant signal.

22. The method according to claim 1, wherein said data represents video signals, whereby inactivity is defined as at least one of:
no image;
background noise; and
still.

23. The method according to claim 1, wherein said coding delay is dependent on a jitter buffer depth.

24. The method according to claim 23, wherein said dynamically assigning of coding delay comprises:
setting a target jitter buffer fill level dependent on said determination of said information value; and
adjusting a jitter buffer clock to achieve an average fill level equal to said target jitter buffer fill level.

25. The method according to claim 23, wherein said dynamically assigning of coding delay comprises:
setting a target jitter buffer fill level dependent on said determination of said information value; and
inserting or discarding frames to achieve an average fill level equal to said target jitter buffer fill level.

26. The method according to claim 1, wherein said full-duplex communication is a multi-party communication.

27. A full-duplex communication system, comprising:
at least two terminals;
a network connecting said at least two terminals;
transferring means for transferring data in a;
first direction between two of said at least two terminals and for transferring data in a second direction, opposite to said first direction;
coding and decoding means associated with said at least two terminals for coding and decoding data;
detector means for determining an information value carried by said data;
said detector means comprising a first detector for determination of whether said data transferred in said first direction corresponds to activity or inactivity; and
coding control means for controlling coding delay of said coding and decoding means, said coding control means being arranged to dynamically assign coding and decoding associated with a multitude of possible coding delays dependent on said determination of an information value;
said coding control means being arranged to dynamically assign coding or decoding dependent on outputs from said first detector.

28. The system according to claim 27, wherein said associated coding delay is higher for a higher information value.

29. The system according to claim 27, wherein said transferring means comprises means for allocating transmission resource dependent on applied coding delay;
said transmission resource being at least one in the group of:
transmission power;
bit rate used for transmission;
number of packets used for transmission; and
number of allocated transmission channels.

30. The system according to claim 27, wherein said first detector is connected to an incoming link of at least one of said terminals, said coding control means being arranged to dynamically assign decoding dependent on outputs from said first detector.

31. The system according to claim 27, wherein:
said detector means further comprises a second detector for determination of whether said data transferred in said second direction corresponds to activity or inactivity; and
said coding control means being arranged to dynamically assign coding or decoding dependent on outputs from both said first detector and said second detector.

32. The system according to claim 31, wherein said first detector is connected to an incoming link of at least one of said terminals, said second detector is connected to an outgoing link of said at least one of said terminals, said coding control means being arranged to dynamically assign decoding dependent on outputs from both said first detector and said second detector.

33. The system according to claim 27, wherein said coding and decoding means comprises a jitter buffer, said coding control means being a jitter buffer control means.

34. The system according to claim 33, wherein said jitter buffer control means is arranged to control a jitter buffer clock.

35. The system according to claim 33, wherein said jitter buffer control means is arranged to insert or discard frames.

36. The system according to claim 27, wherein said data represents audio signals, whereby said detector is sensitive to at least one of:
   silence;
   background noise; and
   constant signal.

37. The system according to claim 27, wherein said data represents video signals, whereby said detector is sensitive to at least one of:
   no image;
   background noise; and
   still.

38. The system according to claim 27, further comprising:
   means for measuring an actual response time for a message to be sent forward and back in said full-duplex communication system;
   means for adapting minimum and maximum coding delays in response to an output of said means for measuring an actual response time.

39. The system according claim 27, further comprising:
   means for supporting multi-party communication.

40. A terminal, comprising:
   transferring circuitry for transferring data in a full-duplex manner to and from said terminal;
   a coder associated with an outgoing link;
   a decoder associated with an incoming link;
   a detector for determining an information value carried by said data and whether said data transferred over said incoming link or said outgoing link corresponds to activity or inactivity; and
   a coding controller for controlling at least one of said coder and said decoder, said coding controller being arranged to dynamically assign coding or decoding associated with a multitude of possible coding delays dependent on said determination by the detector.

41. The terminal according to claim 40, wherein said coding controller is arranged to dynamically assign coding or decoding associated with a plurality of predetermined coding delay levels.

42. The terminal according to claim 40, wherein said coding controller is arranged to dynamically assign coding or decoding associated with a plurality of coding delay levels based on a set of predetermined coding schemes.

43. The terminal according to claim 40, wherein:
   said detector is configured to determine whether said data transferred over said outgoing link or said incoming link corresponds to activity or inactivity; and
   said coding controller being arranged to dynamically assign decoding dependent on outputs from said detector.

44. The terminal according to claim 43, wherein said decoder comprises a jitter buffer, and wherein said coding controller is a jitter buffer controller.

45. The terminal according to claim 44, wherein said jitter buffer controller is arranged to control a jitter buffer clock.

46. The terminal according to claim 44, wherein said jitter buffer controller is arranged to insert or discard frames.

* * * * *

UNITED STATES PATENT AND TRADEMARK OFFICE
CERTIFICATE OF CORRECTION

| | |
|---|---|
| PATENT NO. | : 7,289,451 B2 |
| APPLICATION NO. | : 10/280096 |
| DATED | : October 30, 2007 |
| INVENTOR(S) | : Bruhn |

Page 1 of 1

It is certified that error appears in the above-identified patent and that said Letters Patent is hereby corrected as shown below:

In Column 1, Line 62, delete "ARM" and insert -- AMR --, therefor.

In Column 1, Line 62, delete "GM" and insert -- GSM --, therefor.

In Column 3, Lines 4-5, delete "frill-duplex" and insert -- full-duplex --, therefor.

In Column 3, Line 7, delete "frill-duplex" and insert -- full-duplex --, therefor.

Signed and Sealed this

Twenty-fourth Day of November, 2009

David J. Kappos
*Director of the United States Patent and Trademark Office*